United States Patent
Querci et al.

(10) Patent No.: US 10,654,945 B2
(45) Date of Patent: May 19, 2020

(54) PROCESS FOR EXTRACTING LATEX, RESIN AND RUBBER FROM GUAYULE PLANTS

(71) Applicant: Versalis S.P.A., San Donato Milanese (IT)

(72) Inventors: Cecilia Querci, Novara (IT); Alessandro Del Seppia, Porto Mantovano (IT); Mirko Oliosi, Castelnuovo Del Garda (IT); Tommaso Prando, San Bonifacio (IT)

(73) Assignee: Versalis S.P.A., San Donato Milanese (IT)

( * ) Notice: Subject to any disclaimer, the term of this patent is extended or adjusted under 35 U.S.C. 154(b) by 175 days.

(21) Appl. No.: 16/062,176

(22) PCT Filed: Dec. 13, 2016

(86) PCT No.: PCT/IB2016/057556
§ 371 (c)(1),
(2) Date: Jun. 14, 2018

(87) PCT Pub. No.: WO2017/103769
PCT Pub. Date: Jun. 22, 2017

(65) Prior Publication Data
US 2018/0371111 A1    Dec. 27, 2018

(30) Foreign Application Priority Data
Dec. 14, 2015 (IT) .......................... 102015000082659

(51) Int. Cl.
*C08C 1/06* (2006.01)
*C08C 1/075* (2006.01)
(Continued)

(52) U.S. Cl.
CPC .................. *C08C 1/06* (2013.01); *C08C 1/02* (2013.01); *C08C 1/075* (2013.01); *C08J 99/00* (2013.01);
(Continued)

(58) Field of Classification Search
None
See application file for complete search history.

(56) References Cited

U.S. PATENT DOCUMENTS 2,434,412 A * 1/1948 Jones ........................ C08C 4/00
528/490
2,459,369 A * 1/1949 Tint ....................... B01D 11/04
528/493
(Continued)

FOREIGN PATENT DOCUMENTS

EP      0164137 A2    12/1985
GB      2164341 A     3/1986
(Continued)

OTHER PUBLICATIONS

International Search Report and Written Opinion for PCT/IB2016/057556 dated Mar. 3, 2017, 11 pages.
(Continued)

*Primary Examiner* — Peter A Salamon
(74) *Attorney, Agent, or Firm* — Praedcere Law

(57) ABSTRACT

The present invention relates to the industrial sector of extracting and processing natural rubber, and other components, from plant material. In particular, the invention relates to a process for extracting latex, resin and rubber from guayule and/or guayule-type plants, which comprises harvest, preservation, mechanical and chemical treatment of the plant parts, which is applicable both in the laboratory and on an industrial scale and is characterised by significantly high yields and high quality of the extracted products.

29 Claims, 5 Drawing Sheets

Figure 1:
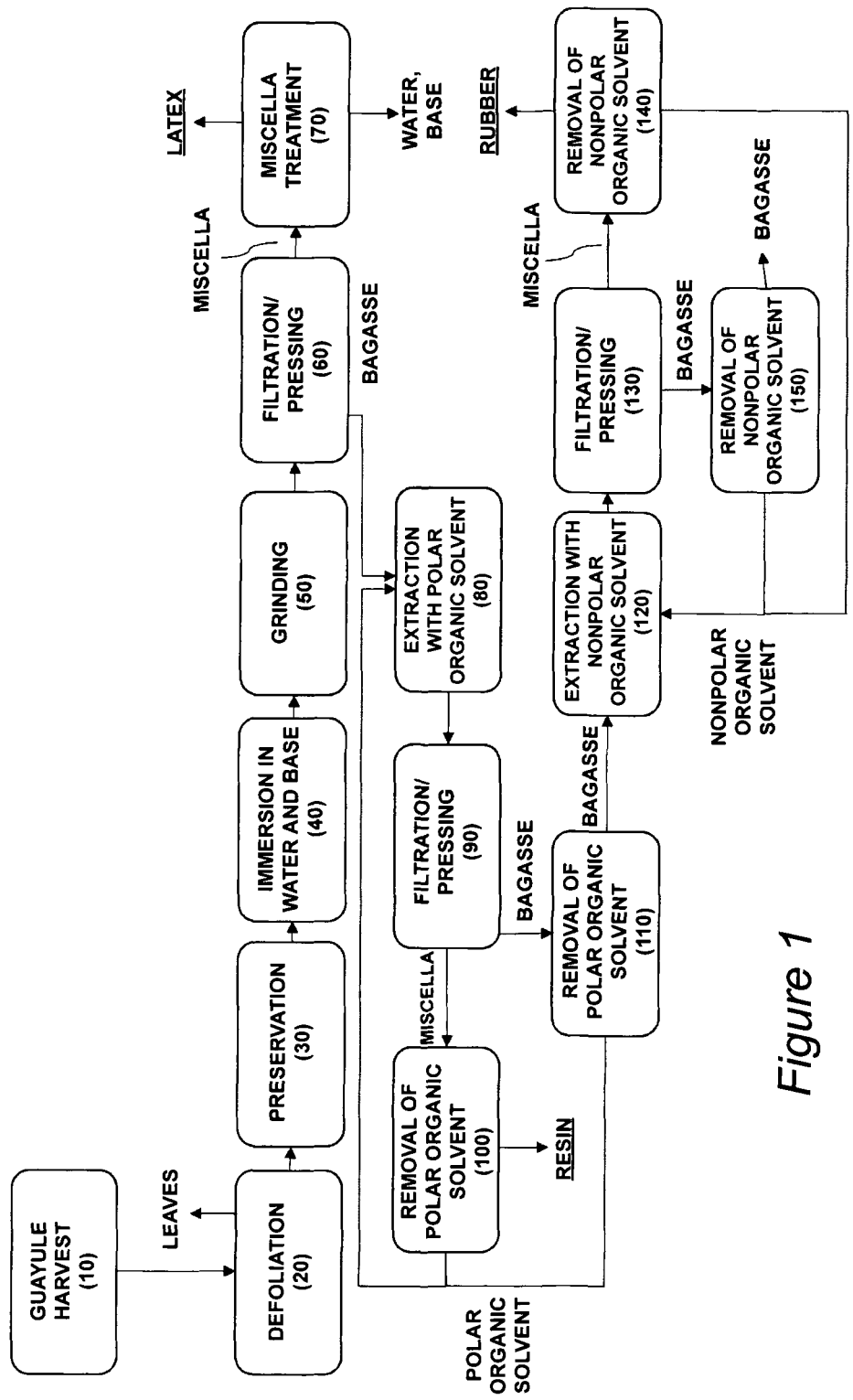

(51) Int. Cl.
  *C08C 1/02* (2006.01)
  *C08J 99/00* (2006.01)
  *C08L 7/02* (2006.01)

(52) U.S. Cl.
  CPC ............ *C08L 7/02* (2013.01); *C08J 2307/02* (2013.01); *C08L 2201/54* (2013.01)

(56) References Cited

U.S. PATENT DOCUMENTS

| | | | | |
|---|---|---|---|---|
| 4,159,903 | A * | 7/1979 | Bauman | A01N 33/04 504/244 |
| 4,435,337 | A * | 3/1984 | Kay | C08J 11/06 528/491 |
| 4,526,959 | A * | 7/1985 | Kay | C08J 11/06 526/348 |
| 4,623,713 | A * | 11/1986 | Beinor | C08C 2/00 526/335 |
| 4,681,929 | A * | 7/1987 | Cole | C09F 1/00 528/493 |
| 7,923,039 | B2 * | 4/2011 | Cornish | B01D 11/0284 424/725 |
| 8,431,667 | B2 * | 4/2013 | Cornish | A61F 6/04 525/331.9 |
| 2012/0063969 | A1 * | 3/2012 | Cornish | B01D 11/0284 422/261 |
| 2014/0288255 | A1 * | 9/2014 | Martin | C08C 2/02 526/340.4 |
| 2015/0232583 | A1 * | 8/2015 | Fraley | B01D 11/0288 526/335 |
| 2018/0371111 | A1 * | 12/2018 | Querci | C08C 1/02 |

FOREIGN PATENT DOCUMENTS

| | | |
|---|---|---|
| WO | WO2009/078883 A1 | 6/2009 |
| WO | WO2013/134430 A1 | 9/2013 |
| WO | WO2014/047176 A1 | 3/2014 |
| WO | WO2017/103775 A1 | 6/2017 |
| WO | WO2017/103782 A1 | 6/2017 |

OTHER PUBLICATIONS

"Guayule: An Alternative Source of Natural Rubber", 1977, National Academy of Sciences.

S. Macrae, M.G. Gilliland, J. Van Staden in "Rubber production in guayule: determination of rubber producing potential" (1986) Plant Physiol., vol. 81, pp. 1027-1032.

IUPAC Recommendation "Dispersity in polymer science" (2009), Pure Appl. Chem. vol. 81, pp. 351-353.

F.S. Nakayama in "Guayule future development" (2005) Industrial Crops and Products, vol. 22, pp. 3-13.

M. Geppi, F. Ciardelli, C.A. Veracini, C. Forte, G. Cecchin and P. Ferrari in "Dynamics and morphology of polyolefinic elastomers by 13C and 1H solid-state NMR" (1997), Polymer, vol. 38, pp. 5713-5723.

ASTM-D1278.868 Standard Test Methods for Rubber from Natural Sources—Chemical Analysis, 2011, 6 pages.

* cited by examiner

PROCESS FOR EXTRACTING LATEX, RESIN AND RUBBER FROM GUAYULE PLANTS

The present invention relates to the industrial sector of extracting and processing natural rubber, and other components, from plant material.

In particular, the invention relates to a process for extracting latex, resin and rubber from guayule plants, which includes harvest, preservation, mechanical and chemical treatment of the plant parts, is applicable both in the laboratory and on an industrial scale and is characterised by significantly high yields and high quality of the extracted products. Guayule (*Parthenium argentatum*) is a perennial shrub native of the semidesert regions of the south-west of the USA (in particular Texas) and the north of Mexico. This plant accumulates natural rubber, preponderantly composed of the elastomer cis-1,4-polyisoprene, in the form of latex (a milky suspension or dispersion in water), above all in the bark of the branches and stem. The content of natural rubber may depend on various factors relating to the environment, cultivation and preservation and it is between 5 and 20% of the total weight of the dry plant.

Extracting natural rubber from the guayule plant, as well as other plants belonging to the Asteraceae, Euphorbiaceae, Campanulaceae, Labiatae and Moraceae genera such as, for example, *Euphorbia lathyris, Parthenium incanum, Chrysothamnus nauseosus, Pedilanthus macrocarpus, Cryptostegia grandiflora, Asclepias syriaca, Asclepias speciosa, Asclepias subulata, Solidago altissima, Solidago graminifolia, Solidago rigida, Sonchus arvensis, Silphium* spp., *Cacalia atriplicifolia, Taraxacum kok-saghyz, Pycnanthemum incanum, Teucrium canadense* or *Campanula americana* (for brevity's sake denoted "guayule-type"), is an important alternative to extracting natural rubber from *Hevea brasiliensis*, in particular in the light of these species' greater resistance to pathogens which attack *Hevea*, the lower import costs of the raw material of vegetable origin and due to the lower content, in rubber extracted from these plants, in comparison with the rubber derived from *Hevea*, of numerous protein contaminants responsible for type I (or IgE-mediated) latex allergies.

For these reasons, over recent years numerous studies have been carried out into the development of methods and techniques for extracting the natural rubber from non-*Hevea* plants such as, for example, guayule or guayule-type plants.

It is important to note that, while the natural rubber of *Hevea brasiliensis* may be obtained simply by collecting the latex present in the laticiferous ducts along the bark by making cuts through the cortex to said ducts, natural guayule rubber accumulates within the plant's cells (stem, leaves and roots) and may be obtained by crushing the plant material and collecting the cellular components using physical and/or chemical methods.

Prior art processes involve extracting rubber from the guayule plants by grinding the plants and extracting the rubber itself with water or with organic solvents.

International application WO 2014/047176, for example, describes a method for extracting guayule rubber which involves a "post-harvest" (or "pre-extraction") treatment including partial drying of the plant material. WO 2014/047176 in fact demonstrates that when the guayule rubber is extracted from plant material having residual moisture contents below specific values, it is characterised by a significantly lower molecular weight and is consequently of lower quality. Furthermore, extraction efficiency also drops as the residual moisture content falls. The extraction described in the above-stated application is performed with mixtures of nonpolar and polar organic solvents (for example pentane/acetone).

Indeed, from the standpoint of solely recovering the rubber, the majority of processes described in the prior art provide extracting all the main components obtainable from the guayule plant in a single step.

However, for the purpose of meeting quality standards (for example the standards set out by ASTM International), natural rubber must be substantially pure, i.e. must have had other compounds which are extractable from the plant material and other contaminants removed from it: for this reason, methods have been developed which include steps for removing the above-stated compounds which are extractable from the guayule plant, in particular the resin.

International patent application WO 2013/134430 describes a process for extracting the natural rubber from non-*Hevea* plants which involves harvesting the guayule plants, removing the majority of the foliage and partially drying the plant material.

After crushing and grinding, the plant material is suspended in the presence of a polar organic solvent (for example acetone) and a nonpolar organic solvent (for example hexane). Once the bagasse has been separated, a suspension, or miscella, containing rubber and resin is obtained. Further polar organic solvent is added to this miscella so as to cause the rubber to coagulate into particles which are separated by sedimentation. WO 2013/134430 does not describe recovering the residual resin from the miscella from which the high molecular weight rubber was isolated, since its primary focus is on removing the contaminants from the suspension containing the rubber.

U.S. Pat. No. 4,681,929 describes a process for preparing guayule rubber, performed in a single step, in which the plant material is subjected to extraction with polar organic solvents (for example methanol) and nonpolar organic solvents (for example hexane), so giving rise to a miscella containing both rubber and resin. In a preferred aspect of the invention, the process involves a first extraction of the resin with polar organic solvent and a second extraction of the rubber using nonpolar organic solvent. A characteristic feature of the process described in U.S. Pat. No. 4,681,929 is the use of the miscella itself as an extracting agent, added to the fresh solvent in a percentage of up to 90%, consequently reducing the quantity of solvent required for extraction.

Furthermore, the solution containing resin and/or rubber is separated from the bagasse by squeezing instead of sedimentation or gravity draining: in this manner, the volumes of bagasse to be rinsed are particularly small, so enabling a further reduction in the use of organic solvent. In this case too, however, the resin is deemed to be a rubber contaminant which is to be removed and disposed of.

For some time, however, guayule resin, produced by the plant in comparable if not higher amount than rubber, has found uses in various applications, such as for example, the manufacture of adhesives and the production of wood panels resistant to pest attack. For this reason, some processes described in the prior art also place importance on isolating this component.

For example, U.S. Pat. No. 4,435,337 describes a process for extracting rubber, resin, water-soluble compounds and bagasse based on the "historical" process for extracting guayule rubber, known as the "Saltillo process" (described in the volume "Guayule: An Alternative Source of Natural Rubber", 1977, National Academy of Sciences). The process described in U.S. Pat. No. 4,435,337 comprises a preliminary step of partially drying the plant material, followed by extraction of the resin with anhydrous acetone and a stage of recovering the rubber, the water-soluble compounds and the bagasse by flotation of the rubbery material, said latter stage being carried out similarly to the old Saltillo process. It is noted in U.S. Pat. No. 4,435,337 that resin extraction efficiency is all the greater, the lower is the water content of the extracting solvent; it is furthermore observed that, unexpectedly, it is more advantageous for the purpose of extracting the resin itself from the plant material to use the miscella containing concentrated resin, rather than to use fresh solvent.

Patent application US2014/0288255 describes a process for separating rubber, resin and bagasse, comprising a first stage of homogenising the plant material in the presence of a medium capable of solubilising the resin, which is subsequently separated from the bagasse; a second phase of further homogenisation of the bagasse in the presence of a solvent capable of solubilising the rubber, which is subsequently separated from the bagasse; a final stage of drying the rubber and the bagasse which may include, for example, evaporation of the solvent in wiped film evaporators and extrusion of the rubber.

US2014/0288255 furthermore describes a process in which the plant material is homogenised in the presence of a "milling solvent" able to solubilize the rubber and the resin, which are separated from one another in a subsequent purification step using a fractionation solvent.

It should be noted that US2014/0288255, while placing an emphasis on the importance of the correct timing of plant harvesting, by hedging or pollarding, does not provide any teaching regarding the usefulness of optional seasoning of the plants once harvested.

The process described in European patent EP 0 164 137 also does not involve a stage of seasoning the plant material; on the contrary, EP 0 164 137 emphasises the importance of processing the guayule plants immediately after harvest. According to the process of EP 0 164 137, the complete guayule plant is subjected to extraction by countergravity percolation with organic solvents (for example hexane, or the miscella obtained by the above-stated extraction) capable of solubilising both the resin and rubber. In a second stage, a non-solvent for the rubber (for example acetone) is added to the miscella obtained from the extraction, so causing the rubber to precipitate. The deresinated rubber is then recovered in relatively pure form by washing and reprecipitation followed by filtration and/or centrifugation.

As has already been pointed out, guayule rubber is located in the parenchymal cells of this plant in the form of latex, which is a precursor of the natural rubber in suspension form.

Processes which involve the separation of guayule latex have been described in the prior art.

For example, U.S. Pat. No. 7,923,039 describes a process which comprises harvesting the guayule plants at the time of maximum accumulation of latex in suspension form, by hedging and/or pollarding, and chopping said biomass, which is maintained in aqueous solution at a basic pH in the presence of additives, in mills. Once the bagasse has been separated by filtration, the resultant aqueous suspension containing latex is subjected to various separation/concentration steps with the purpose of removing water and any contaminants. U.S. Pat. No. 7,923,039 does not provide any teaching regarding the extraction of resin and residual rubber from the bagasse obtained in the process described therein.

The applicant has identified various drawbacks in the prior art processes:

1. processes which involve extracting rubber and resin in a single step do not permit quantitative recovery of the resin which, as described above, has an intrinsic commercial value;
2. processes which involve the above-stated extraction of rubber and resin in a single step and subsequent separation of the resin, make it possible to obtain rubber but require further purification steps in order to meet the quality standards demanded by the market;
3. the bagasse obtained after extraction in a single step, whether by processes involving the use of solvents or by processes using basic aqueous solutions, may still contain substantial quantities of rubber and resin, and may for this reason be considered unsuitable for utilisation other than as fuel (for example in agriculture or in animal feeding).
4. none of the processes involving solvent extraction of rubber and resin involve extracting the polymer in latex form, which is essential for producing non-allergenic manufactured articles by film coating (for example latex gloves).

The applicant accordingly set out to solve the problem of finding a new process for preparing all the components of guayule plants, i.e. latex, rubber, resin and bagasse, in such a manner as to obtain all said components with product yields, and quality characteristics, which are improved over prior art processes.

One object of the present invention is accordingly that of providing a process for extracting the latex, resin and rubber from guayule plants which is characterised by measures directed at obtaining the maximum extraction yield and which substantially lacks the drawbacks of the above-stated prior art.

For the purposes of the present description and the appended claims, unless stated otherwise, definitions of numerical ranges always include the extremes.

For the purposes of the present description and the appended claims, unless stated otherwise, percentages are by weight.

In the description of the embodiments of the present invention, use of the terms "comprising" and "containing" indicates that the options described, for example relating to the steps of a method or a process or the components of a product or a device, are not necessarily exhaustive. It is, however, important to note that the present application also provides those embodiments in which, in relation to the described options, for example in relation to the steps of a method or a process or the components of a product or a device, the term "comprising" should be interpreted as "which essentially consists of" or "which consists of", even if not explicitly stated.

In the present description and the appended claims, guayule plant is taken to mean generically both the species *Parthenium argentatum* and the guayule-type plants of the species listed above.

For the purposes of the present invention, the term "plant material" is taken to mean any form (for example, the whole plant, plant parts including roots, branches and/or stem, leaves, any bark, plant fragments obtained by chopping, grinding, etc., briquettes and pellets obtained by compacting the plant fragments) in which the guayule plant is used for the purpose of extracting, by chemical and/or physical methods, the rubber, resin and other components present in said plant.

The term "bagasse" is taken to mean the residual portion of plant material deriving from the extraction process. Bagasse may also include small quantities of non-plant material (e.g. loam, sand, etc.) typically associated with the plant roots and derived from the soil in which they have been grown.

For the purposes of the present invention, the term "miscella" is taken to mean a solution, suspension or emulsion composed of latex, rubber and/or resin, water and/or organic solvents in which the extraction process is performed and which is obtained after separation of the bagasse.

For the purposes of the present invention, "volatile matter" refers to compounds other than rubber which may be present within a sample of rubber in the solid state, but which pass into the vapour phase and may be separated from said sample at temperatures of greater than or equal to 100° C.

The volatile matter present in a sample of rubber in the solid state may be determined, for example, by the ASTM D1278-91 (1977) standard test which is known to a person skilled in the art.

Volatile organic compounds or "VOC" (for example, the nonpolar organic solvent present in a sample of rubber in the solid state) and the residual concentration thereof are furthermore determined by gas chromatography with a flame ionisation detector using a standard solution of the above-stated VOCs of known concentration.

Further features and advantages of the present invention will be apparent from the following detailed description and with reference to the appended figures which are intended to illustrate the general features of the method, the structure and/or the materials used in some embodiments of the invention and to complement the following written description.

In particular, FIG. 1 is a complete block diagram of one embodiment of the process of the present invention, starting from whole guayule plants.

Figure 2:
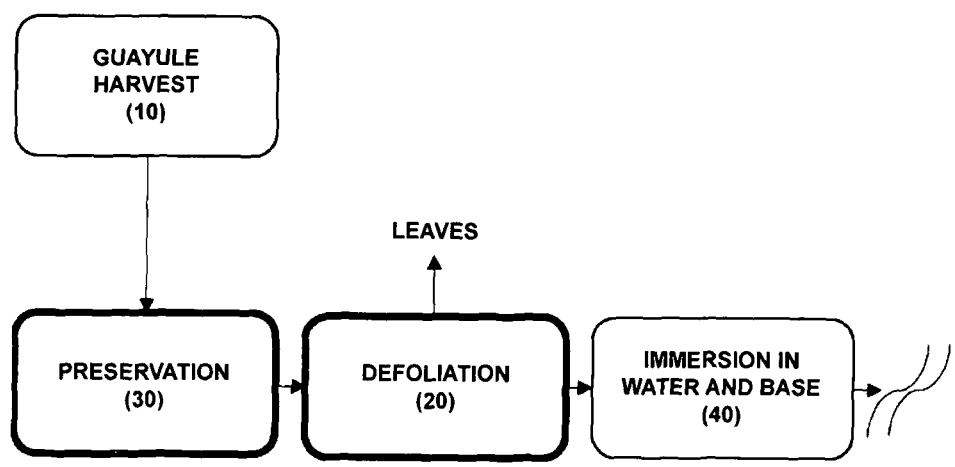

FIG. 2 is a block diagram which represents part of the process according to an alternative embodiment of the present invention, in which defoliation step ("b") and preservation step ("c") are in the reverse order. To ensure greater clarity, the numbering of the steps has not been changed. In said figure, steps "b" and "c" are denoted by bold boxes.

Figure 3:
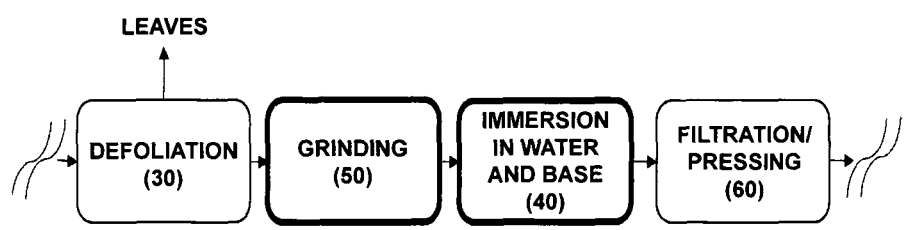

FIG. 3 is a block diagram which represents part of the process according to an alternative embodiment of the present invention, in which immersion step ("d") and grinding step ("e") are in the reverse order. To ensure greater clarity, the numbering of the steps has not been changed. In said figure, steps "d" and "e" are denoted by bold boxes.

Figure 4:
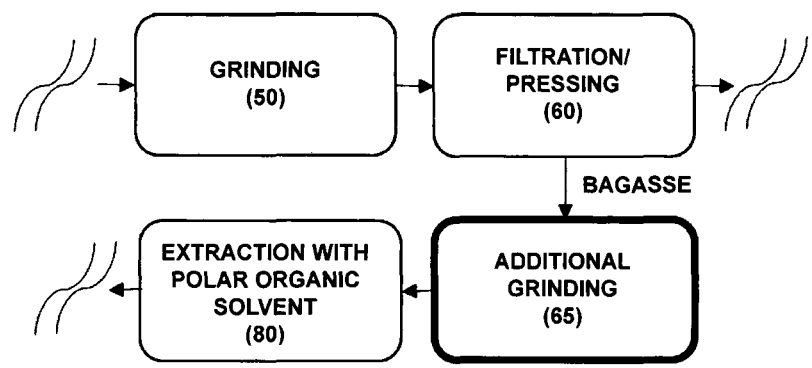

FIG. 4 is a block diagram which represents part of the process according to an alternative embodiment of the present invention in which extraction with polar organic solvent ("h") is preceded by a further bagasse grinding step. To ensure greater clarity, the numbering of the steps has not been changed. In said figure, the additional step is represented by a bold box.

Figure 5:
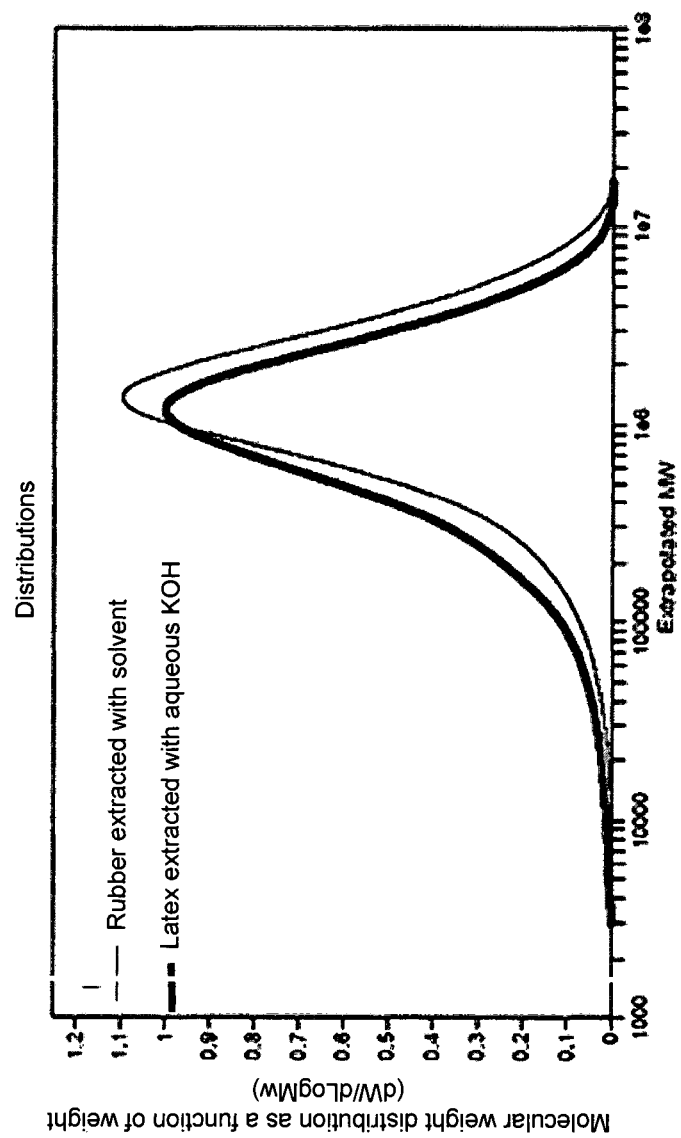

FIG. 5 shows the distribution of molecular weights (MW) of the natural rubber obtained with the process according to the invention, determined by gel permeation chromatographic analysis (GPC), conveniently performed in accordance with standard method ISO 11344:2004, IDT ("Rubber, raw, synthetic—Determination of the molecular-mass distribution of solution polymers by gel permeation chromatography"), using polystyrene as standard. Said method is known to a person skilled in the art. The thin-lined curve relates to the rubber extracted with nonpolar organic solvent; the thick-lined curve relates to the latex rubber extracted with a basic aqueous solution.

It is important to note that the above-stated figures are intended to illustrate the general features of the method, the structure and/or materials used in some embodiments of the invention and to complement the following written description.

These figures are, however, not to scale and may not accurately reflect the precise structural characteristics or performance of a given embodiment, and as such must not be interpreted as defining or limiting a range of values or a property of said embodiment. The use of similar or identical reference numerals in the figures is intended to indicate the presence of one or more similar or identical elements or functions.

The present invention relates to a process for extracting latex, resin and rubber from guayule plants, comprising:

a. harvesting the guayule plants;
b. defoliating said plants;
c. preserving the defoliated plants in an environment under controlled temperature and relative humidity, for a time of between 7 and 21 days, such that the residual moisture present in the plant is maintained in the range of 30-45%;
d. immersing said defoliated plants in a basic aqueous solution comprising a stabilising system;
e. grinding said defoliated plants immersed in said basic aqueous solution to obtain an aqueous suspension of plant material comprising plant fragments;
f. subjecting the aqueous suspension obtained in step "e" to filtration/pressing to separate a first miscella comprising said latex from a first bagasse;
g. recovering the concentrated latex from said first miscella;
h. dispersing said first bagasse in a polar solvent system, comprising at least one polar organic solvent and a stabilising system, to obtain a suspension;
i. subjecting the suspension obtained in step "h" to filtration/pressing to separate a second miscella comprising said resin from a second bagasse;
j. removing the at least one polar organic solvent from said second miscella to obtain the concentrated resin;
k. removing the at least one polar organic solvent from the second bagasse obtained in step "i";
l. dispersing said desolventised second bagasse obtained in step "k" in a nonpolar solvent system, comprising at least one nonpolar organic solvent and a stabilising system, to obtain a suspension;
m. subjecting said suspension obtained in step "l" to filtration/pressing to separate a third miscella comprising said rubber from a third bagasse;
n. removing the at least one nonpolar organic solvent from said third miscella to obtain the rubber in the solid state;
o. removing the at least one nonpolar organic solvent from the third bagasse obtained in step "m".

The steps of the above-stated process may preferably be carried out in sequence from "a" to "o". As described in greater detail below, in some embodiments of the invention, some of the above-stated steps may be carried out simultaneously or in a reverse order to the list mentioned above, without modifying the general principle of the invention.

It is known that the accumulation of rubber in the various parts of guayule plants depends on various factors, such as the age of the plant, the intensity of ambient light, the availability of water, the temperature or the season. For example, in the locations from which the guayule plant originates, it accumulates rubber in the winter months, while during the summer it favours resin production (S. Macrae, M. G. Gilliland, J. Van Staden in "Rubber production in guayule: determination of rubber producing potential" (1986) *Plant Physiol.*, vol. 81, pp. 1027-1032).

According to the invention, the guayule plants are preferably harvested on resumption of the vegetative period of said plants. This period typically covers spring and early summer.

In a preferred embodiment of the present invention, the whole guayule plants are harvested in the field by making a cut at the neck of the stem (if regrowth by offshoots is intended), or are uprooted (if the plant is not shrubby or regrowth is not desired) (FIG. 1, box 10).

In the harvest stage, the plants may be harvested manually or by harvesting machinery, preferably in a size of greater than or equal to 8 cm and less than or equal to 20 cm to facilitate subsequent storage and preservation operations.

In a preferred aspect of the invention, the size may be between 8 and 15 cm and still more preferably between 10 and 12 cm.

For the purposes of the present invention, in the steps subsequent to harvesting, and where not specified otherwise, "plant" is taken to mean both the whole plant and the plant fragments of the harvested size.

Once harvested, the plants may be partially or completely defoliated (20).

Defoliation may be performed manually or mechanically using blade, roller or pneumatic defoliators. In the latter case, the leaves are separated from the stems by vibration and streams of air which exploit the lower density of the leaves in comparison with the branches.

Preferably at least 50% of the leaves are removed from the plants during step "b" of the above-stated process and more preferably at least 90% of the leaves are removed from the plants.

The defoliated plants may then be subjected to a preservation treatment.

The applicant has unexpectedly discovered that, by subjecting the guayule plants, once harvested and defoliated, to an appropriate preservation treatment, and partial drying, in an environment under controlled temperature and relative humidity (30), it is possible to extract high yields of both latex and rubber in which the elastomer is characterised by a high weight-average molecular mass.

Without wishing to be bound by any particular theory, the plant's metabolism may continue for a short period even after cutting and, under particular temperature and humidity conditions, the weight-average molecular mass of the elastomer present in the plant is observed to continue to increase, even increasing as much as threefold relative to the starting value. Furthermore, the rubber extracted after the preservation step according to the invention exhibits a reduced polydispersity index and a distribution of the weight-average molecular masses of said elastomer within a very narrow range, a feature which contributes to defining the overall quality of the natural polymer.

As is known, the polydispersity index, or simply "dispersity", is represented by the ratio between weight-average molecular mass and number-average molecular mass (IUPAC Recommendation "Dispersity in polymer science" (2009), *Pure Appl. Chem.* vol. 81, pp. 351-353).

For the purposes of the present invention, an environment under controlled temperature and relative humidity is taken to mean a location in which the temperature and relative humidity of the air are monitored and modified on the basis of specific requirements.

Relative humidity (RH) is represented by the percentage ratio between the amount of vapour present in a volume of air and the maximum amount which said volume of air may contain (i.e. at saturation) under the same temperature and pressure conditions.

Residual moisture, on the other hand, is taken to mean the percentage water content present in a sample of material. This is calculated by subtracting from 100 the dry substance content determined by weighing the sample after drying at constant pressure and at a temperature of 90° C. for at least 24 hours.

In a preferred aspect of the invention, step "c" of the above-stated process may be carried out in an environment in which the temperature is constantly maintained between 15 and 40° C.

In a further preferred aspect, said step "c" may be carried out in an environment in which the temperature is maintained between 20 and 30° C.

In a preferred aspect of the invention, step "c" of the process according to the invention may be carried out in an environment in which relative humidity is constantly maintained between 80% and 95%.

In a further preferred aspect, said step "c" may be carried out in an environment in which relative humidity is maintained between 80% and 90%.

In a preferred aspect of the invention, step "c" of the above-stated process may be carried out for a time of between 10 and 15 days. It is within the abilities of a relevant skilled person to determine, on the basis of the moisture content in the plants which have just been cut and of the relative humidity and temperature conditions of the environment in which the plants are preserved, the duration of step "c" within the scope of the preferred range, such that the residual moisture of said plants always remains within the 30%-45% range.

In a preferred aspect, the residual moisture of the cut plants may be between 35% and 40% on completion of step "c" of the above-stated process.

In one embodiment of the invention, shown in FIG. 2, preservation step "c" may precede defoliation step "b". In this case, the non-defoliated guayule plants may be preserved.

In one embodiment of the invention, in step "d", the defoliated plants may be immersed in a basic aqueous solution comprising a stabilising system (40). The ratio of the volume of the basic aqueous solution used to the weight of the plant material may preferably be between 1 and 10, and more preferably between 2 and 5.

The pH of the aqueous solution used in step "d" of said process must be sufficiently high to render said solution basic without being caustic and may preferably be greater than or equal to 7.5 and less than or equal to 12.

In a preferred aspect, the basic aqueous solution may comprise a base selected from KOH, NaOH, NH$_4$OH or NaHCO$_3$, or mixtures thereof, in a final concentration of between 0.1% and 0.5% by weight.

The basic aqueous solution preferably comprises 0.15% by weight KOH.

The stabilising system present in the basic aqueous solution may comprise at least one antioxidant. Antioxidants which may advantageously be used are hydroquinone derivatives, compounds derived from phenol substituted with sterically bulky groups or p-phenylenediamines with sterically hindered amino groups or mixtures thereof.

In a preferred aspect, the basic aqueous solution may comprise an antioxidant selected from aqueous mixtures of 2,5-di[tert-amyl]hydroquinone (CAS number 79-74-3) and sodium salt of polymerised alkylnaphthalenesulfonic acid (CAS numbers 9084-06-4/36290-04-7), aqueous mixtures with reaction products of p-cresol, dicyclopentadiene and isobutylene (CAS number 68610-51-5) with or without sodium salt of polymerised alkylnaphthalenesulfonic acid (CAS numbers 9084-06-4/36290-04-7), 4-[[4,6-bis(octyl-thio)-1,3,5-triazin-2-yl]-amino]-2,6-di-tert-butylphenol (CAS number 991-84-4), N-1,3-dimethylbutyl-N'-phenyl-p-phenylenediamine (CAS number 793-24-8), or mixtures of N-1,3-dimethylbutyl-N'-phenyl-p-phenylenediamine (CAS number 793-24-8) and N-1,4-dimethylpentyl-N'-phenyl-p-phenylenediamine (CAS number 3081-01-4), or mixtures thereof. The basic aqueous solution preferably comprises the antioxidant composed of the reaction product of p-cresol, dicyclopentadiene and isobutylene.

The plants (or plant parts) immersed in the above-stated basic aqueous solution comprising the stabilising system are subjected to grinding (50) in the following step "e".

Grinding may be performed with any method and apparatus appropriate for this purpose. For example one or more comminuting machines such as chippers, crushers, granulators, blade mills, hammer mills, smooth or corrugated roller mills, stone mills or ball mills may be used. Grinding step "e" may preferably be performed using one or more hammer mills. In a preferred aspect, the fragments of plant material obtained by grinding step "e" may have an average size of between 0.5 and 7.5 mm. In a further preferred aspect, said fragments have an average size of between 1 and 2 mm.

In an alternative embodiment of the invention represented in FIG. 3, grinding step "e" (50) may be performed before step "d" of immersion in the above-stated basic aqueous solution comprising said stabilising system. In this case, the plants may be immersed in said basic aqueous solution directly in the grinding apparatus (50), or in a separate container downstream of said step. In accordance with said alternative embodiment, the plant material obtained from "dry" grinding step "e" may be maintained, in subsequent step "d", in contact with the basic aqueous solution, with or without stirring, for a time of between 0.1 and 5 hours at a temperature of between 15° C. and 40° C. In a preferred aspect, step "d" may be carried out for a time of between 0.5 and 2.5 hours. The temperature in a preferred aspect may be between 20° C. and 35° C.

Both in the case in which grinding proceeds prior to addition of the basic aqueous solution and in the case in which grinding proceeds on plants already immersed in said basic aqueous solution, the suspension of plant material obtained after grinding is subjected in step "f" to filtration and pressing (60) to separate a suspension comprising the guayule latex ("first miscella") and a solid portion defined as first bagasse.

Filtration/pressing step "f" of the process according to the invention may be performed with press filters, vacuum filters, screw presses, rotary presses, auger presses, membrane presses or with any other mechanical system capable of separating a liquid phase from a solid phase.

The first miscella obtained on completion of step "f" may subsequently be subjected to further treatment to recover the concentrated latex (step "g", 70). The above-stated treatment may have numerous purposes: apart from separating fine solid particles of plant material which have escaped from filtration/pressing, said treatment may have the purpose of eliminating excess water and removing other impurities present in the miscella.

Fine solid particles of plant material may be separated from the first miscella using centrifugal decanters for solid-liquid separation, triphasic centrifugal decanters (which also permit pre-concentration of the latex present in the miscella), or any other mechanical system capable of promoting sedimentation and separation of fine solid particles in a liquid phase.

Excess water may be eliminated using an optionally appropriately adapted continuous disk centrifuge which, by exploiting the difference in density between the latex and the aqueous solution, makes it possible to remove some of the basic aqueous solution from the latex. Alternatively, a concentrated latex may be obtained using other mechanical systems for separating two liquid phases of different density, such as, for example, decanters, florentine separators, etc. Finally, other impurities (for example potential allergens) may be removed in step "g" by subjecting the latex to a number of dilution and reconcentration cycles, using the same devices as described above to remove the excess water. The latex may be diluted using an aqueous solution of a base selected from KOH, NaOH, $NH_4OH$ or $NaHCO_3$, in a concentration of between 0.01% and 0.5% by weight, comprising at least one surfactant of the sulfonic type in a concentration of between 0.1% and 0.5% by weight. The above-stated aqueous solution may comprise an antioxidant as previously described.

Preferably, the latex may be diluted using an aqueous solution comprising 0.05% by weight KOH and the surfactant sodium hexadecyl diphenyl oxide disulfonate.

The latex obtained by the process of the present invention may be used for producing non-allergenic manufactured articles by film coating (for example latex gloves) or components for specific biomedical applications (for example catheters, special prostheses, as described for example in U.S. Pat. No. 8,431,667 and WO 2009/078883) which are characterised by a low risk of triggering allergic reactions in users.

For the above-described purposes, the guayule plant latex may be subjected to a coagulation process, for example by adding organic and/or inorganic acids and/or flocculating agents, so making it possible to obtain rubber characterised by a weight-average molecular mass of between $1 \cdot 10^6$ and $2 \cdot 10^6$ g/mol.

The first bagasse separated by the filtration/pressing step is subjected to a first extraction in step "h", by being dispersed in a polar solvent system (80) comprising at least one polar organic solvent and a stabilising system. In this step, the resin is extracted by the polar solvent system.

In an alternative embodiment of the invention, extraction step "h" may be preceded by an additional grinding step of the first bagasse. Said embodiment is represented in FIG. 3 (65). The purpose of this additional operation is to further crush and defibrate the particles of the first bagasse with the aim of facilitating subsequent extraction with the polar solvent system.

The above-stated additional grinding step (65) may be carried out as already described above with reference to step "e". Comminuting machines such as chippers, crushers, granulators, blade mills, hammer mills, smooth or corrugated roller mills, stone mills or ball mills may be used for this purpose.

Said additional grinding step is preferably carried out with corrugated roller mills and/or with smooth roller mills.

Both in the case in which the first bagasse is subjected directly to extraction with said polar solvent system, and in which it is subjected to an additional grinding step and subsequently to the extraction step with a polar solvent system, the volume to be used of said polar solvent system is calculated on the basis of the weight of said first bagasse. In a preferred aspect, the ratio between the volume of polar solvent system and the weight of the first bagasse may be between 1 and 7 and more preferably it may be between 2 and 5.

The polar solvent system used in extraction step "h" may preferably comprise at least one polar organic solvent, selected from an alcohol having from 1 to 8 carbon atoms (for example, ethanol or isopropanol), ethers or esters having from 2 to 8 carbon atoms (for example ethyl acetate), cyclic ethers having from 4 to 8 carbon atoms, ketones having from 3 to 8 carbon atoms (for example, acetone or methyl ethyl ketone), or mixtures thereof.

In a preferred aspect, the polar organic solvent may be selected from ethanol and acetone.

In a preferred aspect, said polar organic solvent is ethanol.

The stabilising system present in the polar solvent system may comprise at least one antioxidant. Antioxidants which may advantageously be used are hydroquinone derivatives, compounds derived from phenol substituted with sterically bulky groups or p-phenylenediamines with sterically hindered amino groups or mixtures thereof. In a preferred aspect, the polar solvent system may comprise an antioxidant selected from aqueous mixtures comprising 2,5-di[tert-amyl]hydroquinone (CAS number 79-74-3) and sodium salt of polymerised alkylnaphthalenesulfonic acid (CAS numbers 9084-06-4/36290-04-7), aqueous mixtures with reaction products of p-cresol, dicyclopentadiene and isobutylene (CAS number 68610-51-5) and sodium salt of polymerised alkylnaphthalenesulfonic acid (CAS numbers 9084-06-4/36290-04-7), 4-[[4,6-bis(octylthio)-1,3,5-triazin-2-yl]-amino]-2,6-di-tert-butylphenol (CAS number 991-84-4), N-1,3-dimethylbutyl-N'-phenyl-p-phenylenediamine (CAS number 793-24-8), or mixtures of N-1,3-dimethylbutyl-N'-phenyl-p-phenylenediamine (CAS number 793-24-8) and N-1,4-dimethylpentyl-N'-phenyl-p-phenylenediamine (CAS number 3081-01-4), or mixtures thereof. The polar solvent system preferably comprises the antioxidant 4-[[4,6-bis(octylthio)-1,3,5-triazin-2-yl]-amino]-2,6-di-tert-butylphenol.

In a preferred aspect, the polar solvent system may be brought into contact with said first bagasse in one or more countercurrent steps, with or without stirring, for a time of between 0.1 and 5 hours, at a temperature of between 25° C. and the boiling point of the polar organic solvent used.

In a preferred aspect, said step "h" may be carried out for a time of between 0.5 and 2.5 hours.

In a further preferred aspect, said step "h" may be carried out at a temperature of between 35° C. and 50° C.

In a preferred aspect, the polar solvent system and the first bagasse may be brought into contact with one another for a time of between 0.5 and 2.5 hours, at a temperature of between 35 and 50° C.

On completion of the extraction, the suspension of said first bagasse in the polar solvent system is subjected to filtration/pressing (step "i", 90) for the purpose of separating from one another a second resin-enriched miscella and a second bagasse.

Filtration/pressing may be performed as described above in relation to step "f".

In a preferred aspect, the above-stated filtration/pressing of step "i" may be performed at a temperature of between 25° C. and 50° C. Separation of the second resin-enriched miscella from the second bagasse still containing rubber may be promoted in this manner.

It is important to note that some of the rubber present in the plant material (particularly "low molecular weight" rubber, i.e. characterised by a weight-average molecular mass of less than $2 \cdot 10^4$ g/mol) tends to be solubilised by the same polar solvent system used to extract the resin. In a preferred aspect, the filtration/pressing of step "i" of the process according to the invention may be performed at a temperature of between 25° C. and 35° C.

Under such conditions, the low molecular weight rubber extracted from the polar solvent tends to precipitate and may thus be separated by filtration together with the second bagasse. The resultant miscella thus substantially contains only resin.

In a preferred aspect, said filtration/pressing of step "i" may be performed at a temperature of between 35° C. and 50° C. Under such conditions, the low molecular weight rubber tends to remain in solution and thus the miscella obtained after filtration/pressing, possibly comprising said low molecular weight rubber, may or may not, depending on use, be subjected to a further separation step of the resin from the above-stated low molecular weight rubber.

The second resin-enriched miscella is conveniently treated (step "j", 100) in such a manner as to remove the polar organic solvent, which may be recycled to extraction step "h", and recover the resin extracted from the plant in concentrated form.

Said treatment may be performed by evaporation by indirect heat and/or direct steam stripping and/or air stripping at atmospheric pressure or under a vacuum.

It is important to emphasise that, together with the resin extracted from the plant in step "h", the second miscella may contain a certain amount of water which, in step "j", must be separated from the polar organic solvent by distillation, prior to recycling of said solvent to extraction step "h".

The guayule resin may be used in numerous fields of application, as described, for example, by F. S. Nakayama in "Guayule future development" (2005) *Industrial Crops and Products*, vol. 22, pp. 3-13.

The resin is rich in secondary metabolites including fatty acid glycerides, waxes and isoprene components belonging to the terpene family which are of potential interest to the essential oil industry and for the production of insect pheromones which have in some case exhibited properties of interest to the pharmacological and cosmetics sector.

The resin fraction may furthermore advantageously be used in the treatment of timber materials used in building to increase their resistance to atmospheric agents and parasitic attack such as, for example, by fungi and termites.

The second bagasse obtained from filtration/pressing step "i", from which the resin has been removed but still containing rubber, has the residual polar organic solvent removed by evaporation by indirect heat and/or direct steam stripping and/or air stripping at atmospheric pressure or under a vacuum (step "k", 110).

In this manner, mixing between the polar solvent system and the nonpolar solvent system used in the subsequent rubber extraction stage is avoided.

The polar organic solvent recovered from removal step "k" (110) is combined with the same solvent recovered from removal step "j" (100), and recycled to step "h" (80), optionally after distillation to eliminate the residual water content.

The second bagasse, from which the resin and polar organic solvent has been removed, is then subjected to a second extraction step in step "I", by being dispersed in a nonpolar solvent system (120) comprising at least one nonpolar organic solvent and a stabilising system. In this step, the rubber is extracted by the nonpolar solvent system.

The volume of said nonpolar solvent system to be used is calculated on the basis of the weight of said second bagasse. In a preferred aspect, the ratio between the volume of nonpolar solvent system and the weight of the second bagasse may be between 1.5 and 7, and is preferably between 2 and 5.

The nonpolar solvent system used in extraction step "l" may comprise at least one hydrocarbon solvent. Preferably, said at least one solvent may be selected from linear or branched alkanes having from 4 to 9 carbon atoms (for example, pentane, hexane or heptane), cycloalkanes or alkyl cycloalkanes having from 5 to 10 carbon atoms (for example, cyclopentane or cyclohexane), aromatic hydrocarbons having from 6 to 10 carbon atoms (for example, benzene, toluene or xylene), or mixtures thereof.

In a preferred aspect, the nonpolar organic solvent is hexane.

In a preferred aspect, the nonpolar organic solvent is cyclohexane.

The stabilising system present in the nonpolar solvent system may comprise at least one antioxidant. Antioxidants which may advantageously be used are hydroquinone derivatives, compounds derived from phenol substituted with sterically bulky groups or p-phenylenediamines with sterically hindered amino groups or mixtures thereof. In a preferred aspect, the nonpolar solvent system may comprise an antioxidant selected from aqueous mixtures comprising 2,5-di[tert-amyl]hydroquinone (CAS number 79-74-3) and sodium salt of polymerised alkylnaphthalenesulfonic acid (CAS numbers 9084-06-4/36290-04-7), aqueous mixtures with reaction products of p-cresol, dicyclopentadiene and isobutylene (CAS number 68610-51-5) and sodium salt of polymerised alkylnaphthalenesulfonic acid (CAS numbers 9084-06-4/36290-04-7), 4-[[4,6-bis(octylthio)-1,3,5-triazin-2-yl]-amino]-2,6-di-tert-butylphenol (CAS number 991-84-4), N-1,3-dimethylbutyl-N'-phenyl-p-phenylenediamine (CAS number 793-24-8), or mixtures of N-1,3-dimethylbutyl-N'-phenyl-p-phenylenediamine (CAS number 793-24-8) and N-1,4-dimethylpentyl-N'-phenyl-p-phenylenediamine (CAS number 3081-01-4), or mixtures thereof. The polar solvent system preferably comprises the antioxidant 4-[[4,6-bis(octylthio)-1,3,5-triazin-2-yl]-amino]-2,6-di-tert-butylphenol.

In a preferred aspect, the nonpolar solvent system may be brought into contact with the second bagasse in one or more countercurrent steps, with or without stirring, for a time of between 0.1 and 5 hours, at a temperature of between 25° C. and the boiling point of the nonpolar organic solvent used.

In a preferred aspect, said step "l" may be carried out for a time of between 0.5 and 2.5 hours.

In a further preferred aspect, said step "l" may be carried out at a temperature of between 35° C. and 60° C.

In a preferred aspect, the nonpolar solvent system and the second bagasse are brought into contact with one another for a time of between 0.5 and 2.5 hours, at a temperature of between 35° C. and 60° C.

On completion, the suspension of bagasse in the nonpolar solvent system is subjected to filtration/pressing (step "m", 130), in order to separate from one another a third rubber-enriched miscella and a third bagasse from which almost all the resin and natural rubber have been removed.

Filtration/pressing may be performed as described above in relation to step "f".

In the subsequent step "n", the third miscella comprising natural rubber is passed to the nonpolar solvent removal step (140) by stripping and/or evaporation to recover the rubber extracted from the plant.

In a preferred aspect, the above-stated removal of the nonpolar organic solvent may be performed by steam stripping in the presence of a dispersant system.

To this purpose, the miscella comprising natural rubber in solution may be fed to a stripping reactor, or "stripper", containing water and including a dispersant system, into which a stream of steam is conveyed. Some of the steam introduced in the system condenses, so supplying the heat necessary to evaporate the solvent: a suspension of natural rubber lump in water is thus obtained.

The dispersant system stabilises the suspension, in such a manner as to promote processability (for example, making it pumpable), and reduces cohesion between the above-stated lumps.

In a preferred aspect of the invention, the dispersant system may comprise at least one water-soluble salt of a metal selected from Al, Ca and Mg, and at least one water-soluble surfactant belonging to the polycarboxylate family. In a preferred aspect of the present invention, said surfactant may be the sodium salt of the copolymer of maleic anhydride and 2,4,4-trimethyl-1-pentene (CAS 37199-81-8). Said surfactant, which is characterised by extremely low toxicity, is sold in liquid, water-miscible form under the name Sopropon® T 36 (Rhône-Poulenc), Geropon® T/36 (Rhodia), or Orotan® 731A ER (Rohm & Haas).

The dispersant system preferably comprises calcium chloride and Orotan® 731A ER.

The efficiency with which the nonpolar organic solvent is removed by steam stripping in the presence of a dispersant system, as described above, is particularly high because the process of removing solvent from the rubber proceeds simultaneously with the formation of the above-stated lumps.

The resultant suspension of rubber lumps in water may be subjected to removal of the liquid phase (for example by filtration and/or wringing the lumps) and evaporation of the water.

Wringing of the lumps and final evaporation of the residual water may be carried out in two separate extruders. The first extruder compresses the rubber lumps, allowing the water to escape in the liquid phase, while the second extruder permits evaporation of the water because, due to dissipation of mechanical energy or application of heat, optionally under vacuum conditions, the temperature of the solid phase increases, so allowing the water to pass directly into the vapour form in an appropriate degassing zone.

On completion of the above-stated treatment, it is possible to obtain a rubber with a content of volatile matter, primarily water, of less than 0.75% by weight, and preferably a volatile matter content of between 0.75% and 0.5%.

The volatile matter content may be determined using the standard analytical method ASTM D1278-91 (1977).

The residual content of polar and nonpolar organic solvents used in the process according to the present invention within the lumps is overall less than 4000 ppm. In a preferred aspect, the residual content of said organic solvents in said rubber may be less than 4000 ppm and greater than or equal to 50 ppm. More preferably, the content of said organic solvents may be between 2000 ppm and 75 ppm.

In a further preferred aspect, the content of said organic solvents may be between 1000 and 100 ppm.

The residual content of organic solvents may be determined by qualitative/quantitative gas chromatographic analysis on a fused silica column, using helium as carrier gas and with a flame ionisation detector (FID). This analysis is performed by dissolving a sample of rubber, weighed to an accuracy of 0.1 mg, in carbon disulfide containing a known amount of n-octane as internal standard. 1 μl of the solution obtained is injected into the gas chromatograph. The instrument is calibrated by injecting 1 μl of a solution containing a known amount of the organic solvent under investigation (accuracy of 0.01 mg) in carbon disulfide containing n-octane as internal standard. The minimum amount detectable with the described method is 1 ppm.

A further advantage of the above-stated treatment is that, once the solvent has been removed, the rubber retains excellent processability, for example in processes involving vibrating screen separation, pressing, extrusion, etc.

The yield of rubber extracted from guayule plants by applying the process according to the invention may be greater than or equal to 80% in relation to the total amount of rubber present in the plants. The above-stated total amount of rubber is determined by $^{13}C$ solid-state NMR spectroscopy, as described by M. Geppi, F. Ciardelli, C. A. Veracini, C. Forte, G. Cecchin and P. Ferrari in "Dynamics and morphology of polyolefinic elastomers by $^{13}C$ and $^{1}H$ solid-state NMR" (1997), *Polymer*, vol. 38, pp. 5713-5723.

In a preferred aspect, the above-stated rubber extraction yield may be between 80 and 95%.

The resultant rubber is characterised by a weight-average molecular mass of between $1 \cdot 10^6$ and $2 \cdot 10^6$ g/mol.

The polydispersity index of the guayule natural rubber obtained with the process according to the invention is preferably comprised between 2 and 5, more preferably comprised between 2.5 and 3.5.

The present invention accordingly further provides the guayule rubber obtained by the process according to the invention, characterised by a weight-average molecular mass of between $1 \cdot 10^6$ and $2 \cdot 10^6$ g/mol, a volatile matter content of less than 0.75% by weight and a residual organic solvent content of less than 4000 ppm.

In a preferred aspect, the residual content of said organic solvents in said rubber may be less than 4000 ppm and greater than or equal to 50 ppm. More preferably, the content of said organic solvents may be between 2000 ppm and 75 ppm.

In a further preferred aspect, the content of said organic solvents may be between 1000 and 100 ppm.

The natural rubber obtained by the process of the present invention may be processed for variety of different commercial uses. The properties of natural guayule rubber make it particularly appropriate for producing natural rubber manufactured articles with physical properties similar to or surpassing those of natural rubber from *Hevea brasiliensis* and particularly suitable for applications in the sectors of childcare articles, sports gear and consumables for biomedical use.

The third bagasse obtained in step "m", from which resin and rubber has been removed and still containing residual nonpolar organic solvent, is subjected to removal of said solvent (150) in step "o" of the process according to the invention by indirect heat and/or direct steam stripping and/or air stripping at atmospheric pressure or under a vacuum.

The bagasse collected on completion of the process may be subjected to hydrolysis and fermentation processes which allow a product of use in animal feeding to be obtained. It is obvious that such use is subject to removal from the bagasse of the rubber and resin which were originally present.

In other cases, the bagasse may be reused in secondary processes to obtain, for example, bioadhesives or biopesticides, and, as a source of second-generation sugars, subsequently converted by fermentation into biofuels and/or bioethanol.

The woody material derived from the bagasse may be further processed to obtain building material, fuel pellets and briquettes, or used in agriculture as a mulch or fertiliser.

The nonpolar organic solvent recovered from removal step "o" (150) is combined with the same solvent recovered from removal step "n" (140), and recycled to extraction step "l" (120).

Some non-limiting examples are provided below for the purpose of carrying out and better illustrating the present invention.

It will nevertheless be understood that the process described and illustrated here may be further modified and varied without departing from the scope of the appended claims.

EXAMPLE 1 (TEST OF LATEX EXTRACTION FROM GUAYULE PLANTS USING THE PROCESS ACCORDING TO THE INVENTION)

About 20 guayule plants originating from experimental fields run by the applicant in southern Italy were cut at a height of approx. 10 cm above the ground to obtain approx. 15 kg of biomass.

The plants were defoliated and kept on pallets in a covered and ventilated environment in which temperature and relative humidity were constantly monitored.

After 15 days' preservation in said environment, 200 g of defoliated plants (with residual moisture of 41%) were immersed in 0.5 L of a 0.2% by weight solution of KOH in water containing 1 mL of Wingstay® L (reaction product of p-cresol, dicyclopentadiene and isobutylene) as antioxidant and shredded with a hammer mill until fragments smaller than 0.5 mm were obtained.

The suspension of plant material was filtered and the resultant miscella was centrifuged to separate the latex from the fine solid particles and excess water.

The miscella containing the latex (400 mL) was treated with 10 mL of 20% (vol./vol.) sulfuric acid and maintained at 70° C. for one hour to coagulate the latex contained therein. 3.8 g of rubber were obtained in this manner, amounting to an extracted product yield of 50% in relation to the amount of rubber present in the plant. The total quantities of rubber and resin present in the defoliated plant were determined by $^{13}C$ solid-state NMR and FTIR spectroscopy.

The rubber obtained from the latex, analysed by gel permeation chromatography using polystyrene as standard, is characterised by a weight-average molecular mass of $1.6 \cdot 10^6$ g/mol. On the basis of the molecular weight distribution profile, it may be noted that the rubber obtained is characterised by an extremely narrow range of molecular weights (greater than or equal to $1 \cdot 10^6$ g/mol and less than or equal to $2 \cdot 10^6$ g/mol) with a polydispersity index of 3.1, so bearing witness to the high quality of said rubber (FIG. 5).

EXAMPLE 2 (TEST OF RESIN EXTRACTION FROM GUAYULE PLANTS USING THE PROCESS ACCORDING TO THE INVENTION)

The first bagasse obtained as described in Example 1 (275 g, 60% in $H_2O$) was transferred into a 2 L glass flask and dispersed in 1000 mL of pure ethanol (95%) in which were dissolved 5 mg of Irganox® 565 (4-[[4,6-bis(octylthio)-1,3,5-triazin-2-yl]-amino]-2,6-di-tert-butylphenol) as antioxidant.

The resultant suspension was maintained at 40° C. for 1 hour with constant stirring (with mechanical stirrer set at 150 rpm) and was then subjected to filtration using a Gooch filter (porosity 10-15 μm) to separate the resin-enriched miscella (permeate) from the second bagasse containing the rubber. The above-stated bagasse was also subjected to pressing in the filtration device with the aim of promoting recovery of the ethanolic fraction containing the resin.

8.3 g of resin were obtained from the miscella which had been subjected to evaporation, representing an extracted product yield of 94% in relation to the amount of resin present in the plant. The total amount of resin present in the defoliated and partially dried plant was determined by FTIR spectroscopy.

EXAMPLE 3 (TEST OF RUBBER EXTRACTION FROM GUAYULE PLANTS USING THE PROCESS ACCORDING TO THE INVENTION)

The second bagasse, obtained as described in Example 2 was subjected to ethanol removal by vacuum stripping. It was then weighed (101 g) and transferred into a 1 L glass flask, where it was dispersed in 500 mL of pure hexane (95%) in which were dissolved 0.2 g of Irganox® 565 (4-[[4,6-bis(octylthio)-1,3,5-triazin-2-yl]-amino]-2,6-di-tert-butylphenol) as antioxidant.

The resultant suspension was maintained at 55° C. for 1 hour with constant stirring (with a mechanical stirrer set at 150 rpm) and was then subjected to filtration through a Celite pad (thickness 20 mm) to separate the rubber-enriched miscella (permeate) from the third bagasse from which resin and rubber have been removed. The above-stated bagasse was also subjected to pressing in the filtration device with the aim of promoting recovery of the liquid fraction containing the rubber in solution.

The rubber-enriched miscella was then subjected to evaporation of the solvent by stripping to recover the rubber.

The resultant rubber, 1.8 g, analysed by gel permeation chromatography using polystyrene as standard, is characterised by a weight-average molecular mass of $1.8 \cdot 10^6$ g/mol (FIG. 4). The rubber is characterised by a polydispersity index of 2.9, so bearing witness to the high quality of said rubber.

COMPARATIVE EXAMPLE 4 (TEST OF LATEX EXTRACTION FROM GUAYULE PLANTS NOT ACCORDING TO THE INVENTION)

The same procedure was used as in Example 1, but, after defoliation, the plant was immediately subjected to latex extraction, i.e. without preserving the plants in an environment under controlled humidity and temperature. 4.1 g of rubber were obtained from 200 g of plants, giving a yield of 55%.

The rubber obtained from the latex, analysed by gel permeation chromatography using polystyrene as standard, is characterised by a weight-average molecular mass of $0.8 \cdot 10^6$ g/mol.

COMPARATIVE EXAMPLE 5 (TEST OF LATEX EXTRACTION FROM GUAYULE PLANTS NOT ACCORDING TO THE INVENTION)

The same procedure was used as in Example 1, but, after defoliation, the plant was preserved in an unventilated environment for 15 days, on completion of which the residual moisture is 65%.

1.1 g of rubber were obtained from 200 g of plants, giving a yield of 15%.

The rubber obtained from the latex, analysed by gel permeation chromatography using polystyrene as standard, is characterised by a weight-average molecular mass of $0.8 \cdot 10^6$ g/mol.

COMPARATIVE EXAMPLE 6 (TEST OF LATEX EXTRACTION FROM GUAYULE PLANTS NOT ACCORDING TO THE INVENTION)

The same procedure was used as in Example 1, with the difference that the plant was harvested using a combine harvester which produced a size of less than 2 cm, so making defoliation impossible.

The plant was preserved in an unventilated environment, in which neither the temperature nor the relative humidity of the environment was monitored, for 15 days, on completion of which the residual moisture was 60%.

0.7 g of rubber were obtained, giving a yield of 9%.

The rubber obtained from the latex, analysed by gel permeation chromatography using polystyrene as standard, is characterised by a weight-average molecular mass of $0.7 \cdot 10^6$ g/mol.

EXAMPLE 7 (EXTRACTION OF NONPOLAR ORGANIC SOLVENT FROM THE GUAYULE RUBBER BY STRIPPING IN A STREAM OF STEAM)

17 L of demineralised water were placed in a 50 L stripper equipped with a double propeller mechanical stirrer with baffles. The mechanical stirrer of the stripper was then set in motion at a speed of 396 rpm.

Steam feed from a 1 inch line was begun and 3.44 g of Orotan® 731 and 0.24 g of $CaCl_2$ were added in succession.

Then, using a ¼ inch line, 500 g of a solution of guayule rubber in cyclohexane containing 8% by weight guayule rubber in relation to the total weight of said solution, obtained in accordance with the process of the present invention, were fed in at a flow rate of 200 g/min.

The steam flow rate was controlled so as to maintain the temperature of the water at 98° C.

The vapours produced during mixing, essentially comprising uncondensed steam and cyclohexane vapours, were discharged via a valve present at the top of the stripper and passed into a condenser. The aqueous phase comprising condensed steam and condensed cyclohexane, exiting from the condenser, was passed into a decanter in which a stream of water and a stream of cyclohexane were separated and sent for further treatment.

On completion of feeding the above-stated solution of guayule rubber in cyclohexane, a valve at the bottom of the stripper was opened and the polymer solution comprising guayule rubber lumps and water, exiting from the bottom of the stripper, was passed into a filter, from which were recovered a stream of water, sent for disposal, and the rubber lumps were sent for a subsequent drying step.

The invention claimed is:
1. Process for extracting latex, resin and rubber from guayule plants, comprising:
   a. harvesting the guayule plants;
   b. defoliating said plants;
   c. preserving the defoliated plants in an environment under controlled temperature and relative humidity, for a time of between 7 and 21 days, such that the residual moisture present in the plant is maintained in the range of 30-45%;

d. immersing the defoliated plants in a basic aqueous solution which comprises a stabilising system;
e. grinding said defoliated plants immersed in said basic aqueous solution to obtain an aqueous suspension of plant material comprising plant fragments;
f. subjecting the aqueous suspension obtained in step "e" to filtration/pressing to separate a first miscella comprising said latex from a first bagasse;
g. recovering the concentrated latex from said first miscella;
h. dispersing said first bagasse in a polar solvent system, comprising at least one polar organic solvent and a stabilising system, to obtain a suspension;
i. subjecting the suspension obtained in step "h" to filtration/pressing to separate a second miscella comprising said resin from a second bagasse;
j. removing the at least one polar organic solvent from said second miscella to obtain the concentrated resin;
k. removing the at least one polar organic solvent from the second bagasse obtained in step "i";
l. dispersing said desolventised second bagasse obtained in step "k" in a nonpolar solvent system, comprising at least one nonpolar organic solvent and a stabilising system, to obtain a suspension;
m. subjecting the suspension obtained in step "l" to filtration/pressing to separate a third miscella comprising said rubber from a third bagasse;
n. removing the at least one nonpolar organic solvent from the third miscella to obtain the rubber in the solid state;
o. removing the at least one nonpolar organic solvent from the third bagasse obtained in step "m".

2. Process according to claim 1, in which the steps of said process are carried out in sequence from "a" to "o".

3. Process according to claim 1, in which the guayule plants are harvested on resumption of the vegetative period of said plants.

4. Process according to claim 1, in which the plants are harvested with a size greater than or equal to 8 cm and less than or equal to 20 cm.

5. Process according to claim 1, in which step "c" is carried out for a time of between 10 and 15 days, in an environment in which the temperature is constantly maintained between 15 and 40° C., and/or in which the relative humidity is constantly maintained between 80% and 95%.

6. Process according to claim 1, in which preservation step "c" precedes defoliation step "b".

7. Process according to claim 1, in which the pH of said basic aqueous solution is greater than or equal to 7.5 and less than or equal to 12.

8. Process according to claim 1, in which, in step "d" of said process, the ratio of the volume of said basic aqueous solution to the weight of the plant material ranges between 1 and 10 and preferably between 2 and 5.

9. Process according to claim 1, in which said basic aqueous solution comprises a base selected from KOH, NaOH, NH$_4$OH, NaHCO$_3$, or mixtures thereof, in a final concentration of between 0.1% and 0.5% by weight.

10. Process according to claim 1, in which grinding step "e" is performed using one or more hammer mills.

11. Process according to claim 1, in which the fragments of plant material obtained by grinding step "e" have an average size of between 0.5 and 7.5 mm.

12. Process for extracting latex, resin and rubber from guayule plants, comprising:
a. harvesting the guayule plants;
b. defoliating said plants;
c. preserving the defoliated plants in an environment under controlled temperature and relative humidity, for a time of between 7 and 21 days, such that the residual moisture present in the plant is maintained in the range of 30-45%;
d. grinding said defoliated plants;
e. immersing said ground defoliated plants in a basic aqueous solution which comprises a stabilising system to obtain an aqueous suspension of plant material comprising plant fragments;
f. subjecting the aqueous suspension obtained in step "e" to filtration/pressing to separate a first miscella comprising said latex from a first bagasse;
g. recovering the concentrated latex from said first miscella;
h. dispersing said first bagasse in a polar solvent system, comprising at least one polar organic solvent and a stabilising system, to obtain a suspension;
i. subjecting the suspension obtained in step "h" to filtration/pressing to separate a second miscella comprising said resin from a second bagasse;
j. removing the at least one polar organic solvent from said second miscella to obtain the concentrated resin;
k. removing the at least one polar organic solvent from the second bagasse obtained in step "i";
l. dispersing said desolventised second bagasse obtained in step "k" in a nonpolar solvent system, comprising at least one nonpolar organic solvent and a stabilising system, to obtain a suspension;
m. subjecting the suspension obtained in step "l" to filtration/pressing to separate a third miscella comprising said rubber from a third bagasse;
n. removing the at least one nonpolar organic solvent from the third miscella to obtain the rubber in the solid state;
o. removing the at least one nonpolar organic solvent from the third bagasse obtained in step "m".

13. Process according to claim 1, in which extraction step "h" is preceded by an additional grinding step of the first bagasse.

14. Process according to claim 13, in which said additional grinding step is carried out with corrugated roller mills and/or smooth roller mills.

15. Process according to claim 1, in which, in step "h" of said process, the ratio of the volume of the polar solvent system to the weight of the first bagasse is between 1 and 7.

16. Process according to claim 1, in which the polar solvent system used in extraction step "h" comprises at least one polar organic solvent, selected from an alcohol having from 1 to 8 carbon atoms, ethers and esters having from 2 to 8 carbon atoms, cyclic ethers having from 4 to 8 carbon atoms, ketones having from 3 to 8 carbon atoms, or mixtures thereof.

17. Process according to claim 16, in which said polar organic solvent is selected from ethanol and acetone.

18. Process according to claim 1, in which said polar solvent system is brought into contact with said first bagasse in one or more countercurrent steps, with or without stirring, for a time of between 0.1 and 5 hours, at a temperature of between 25° C. and the boiling point of the polar organic solvent used.

19. Process according to claim 1, in which said filtration/pressing step "i" is performed at a temperature of between 25° C. and 50° C.

20. Process according to claim 1, in which, in step "l" of said process, the ratio of the volume of the nonpolar solvent system to the weight of the second bagasse is between 1.5 and 7.

21. Process according to claim 1, in which the nonpolar solvent system used in extraction step "1" comprises at least one hydrocarbon solvent selected from linear or branched alkanes having from 4 to 9 carbon atoms, cycloalkanes or alkyl cycloalkanes having 5 to 10 carbon atoms, aromatic hydrocarbons having 6 to 10 carbon atoms, or mixtures thereof.

22. Process according to claim 21, in which said hydrocarbon solvent is selected from hexane and cyclohexane.

23. Process according to claim 1, in which said nonpolar solvent system is brought into contact with the second bagasse in one or more countercurrent steps, with or without stirring, for a time of between 0.1 and 5 hours, at a temperature of between 25° C. and the boiling point of the nonpolar organic solvent used.

24. Process according to claim 1, in which the nonpolar organic solvent is removed in step "n" from the third miscella comprising the natural rubber by steam stripping in the presence of a dispersant system.

25. Process according to claim 24, in which said dispersant system comprises at least one water-soluble salt of a metal selected from Al, Ca and Mg, and at least one water-soluble surfactant belonging to the polycarboxylate family.

26. Process according to claim 1, in which the yield of rubber extracted from guayule plants is greater than or equal to 80% in relation to the total amount of rubber present in the plants.

27. Guayule rubber obtained by the process according to claim 1, characterised by a weight-average molecular mass of between $1 \cdot 10^6$ and $2 \cdot 10^6$ g/mol, a volatile matter content of less than 0.75% by weight and a residual organic solvent content of less than 4000 ppm.

28. Guayule rubber according to claim 27, in which the content of said organic solvents is less than 4000 ppm and greater than or equal to 50 ppm.

29. Guayule rubber according to claim 27, wherein the polydispersity index is between 2 and 5.

* * * * *